United States Patent [19]
Tawara

[11] Patent Number: 5,628,613
[45] Date of Patent: May 13, 1997

[54] GOODS DROP OUT METHOD

[75] Inventor: Hirotoshi Tawara, Kasukabe, Japan

[73] Assignee: Kao Corporation, Tokyo, Japan

[21] Appl. No.: 534,125

[22] Filed: Sep. 26, 1995

Related U.S. Application Data

[62] Division of Ser. No. 30,352, Mar. 18, 1993, Pat. No. 5,482,423.

[30] Foreign Application Priority Data

| Aug. 1, 1991 | [JP] | Japan | 3-214228 |
| Aug. 1, 1991 | [JP] | Japan | 3-214229 |
| Aug. 1, 1991 | [JP] | Japan | 3-214230 |

[51] Int. Cl.$^6$ ............................................. B65G 1/04
[52] U.S. Cl. ............................................. 414/786; 414/414
[58] Field of Search ................. 53/247, 249, 255, 53/263, 257; 414/403, 404, 405, 414, 786, 266, 267, 276; 186/2 R; 221/242; 220/1.5, 529, 530, 532, 533, 534, 544

[56] References Cited

U.S. PATENT DOCUMENTS

| 2,704,144 | 3/1955 | Rety et al. | 221/242 X |
| 2,718,326 | 9/1955 | LeBlanc. | |
| 3,028,028 | 4/1962 | Nilsson | 414/414 |
| 5,020,165 | 6/1991 | Tanaka et al. | 414/404 X |
| 5,020,965 | 6/1991 | Tanaka et al. | 414/404 X |
| 5,352,081 | 10/1994 | Tanaka | 186/2 X |

FOREIGN PATENT DOCUMENTS

| 644686 | 3/1964 | Belgium | 221/242 |
| 0339610A2 | 11/1989 | European Pat. Off. . | |
| 2023102A | 12/1979 | Germany . | |

*Primary Examiner*—Frank E. Werner
*Attorney, Agent, or Firm*—Frishauf, Holtz, Goodman, Langer & Chick

[57] ABSTRACT

Goods drop out device 14 having goods receptacle portions 27 defined in a drop out box 23 and shutter devices 21 for opening and closing the bottoms of the goods receptacle portions 27, comprises the shutter devices 21 each comprise a smaller opening and closing member 56 pivotable about a support shaft 58 extending substantially in parallel to the bottom of the goods receptacle portion 27 for opening and closing the bottom, a pushing rod 62 contacting with the lower surface of the smaller opening and closing member 56 and moving toward and away from the lower surface, and an opening and closing cylinder device 63 for driving the pushing rod 62 and operating to close the bottom of the goods receptacle portion 27 by pushing up the opening and closing member 56 by the pushing rod 62.

6 Claims, 7 Drawing Sheets

FIG. 7

| COLUMN DIRECTION / ROW DIRECTION | | 4 COLUMNS | 6 COLUMNS |
|---|---|---|---|
| | | SIZE OF THE GOODS $l_6 \leq l \leq l_4$ | $l_8 \leq l \leq l_6$ |
| 2 ROWS | SIZE OF THE GOODS $W_4 \leq W \leq W_2$ | NUMBER OF STORING THE GOODS 8(2×4) | NUMBER OF STORING THE GOODS 12(2×6) |
| 4 ROWS | $W_6 \leq W \leq W_4$ | NUMBER OF STORING THE GOODS 16(4×4) | NUMBER OF STORING THE GOODS 24(4×6) |
| 6 ROWS | $W \leq W_6$ | NUMBER OF STORING THE GOODS 24(6×4) | NUMBER OF STORING THE GOODS 36(6×6) |

GOODS DROP OUT METHOD

This is a division of application Ser. No. 08/030,352 filed Mar. 18, 1993, now U.S. Pat. No. 5,482,423 issued Jan. 9, 1996.

BACKGROUND OF THE INVENTION

1. Field of the Invention

The present invention relates to a goods drop out device and method therefor. More particularly, the invention relates to a goods drop out device suitable for picking of goods in a goods delivery center and so forth.

2. Prior Art (A) As disclosed in Japanese Unexamined Utility Model Publication No. 2-86903, a conventional goods picking device employs goods receptacle portions defined in a drop out box and opening and closing devices for opening and closing bottoms of the goods receptacle portions so that the goods can be dropped out of each goods receptacle portion by an opening operation of the opening and closing device onto a collecting conveyer or so forth.

Here, in the conventional goods drop out device, the opening and closing device comprises an opening and closing member for opening and closing the bottom of the goods receptacle portion by movement in parallel to the bottom, and an opening and closing cylinder assembly for shifting the opening and closing member in a range where the opening and closing member is permitted to open and close the bottom of the goods receptacle portion.

However, in the prior art, when the sizes of the goods to be objects of dropping out are different from each other, the arrangement pattern of the goods receptacle portion defined in the drop out box can be differentiated resulting in a difference of the size of the bottom opening of each goods receptacle portion to be opened and closed by the opening and closing member, and thus in a difference of the range of movement of the opening and closing member to accordingly differentiate the stroke length of the opening and closing cylinder assembly. Namely, in the prior art, for drop out devices adapted to drop out mutually different sizes of goods, opening and closing cylinder assemblies having different stroke lengths are required.

An object of the invention is to improve efficiency of facility by enabling to certainly open and close a bottom opening and closing member for goods receptacle portions having mutually different bottom opening sizes employing an opening and closing cylinder assembly having a uniform stroke length.

(B) On the other hand, in the conventional goods picking device, dropping out of the goods onto the collecting conveyer or so forth is by storing the goods in a plurality of goods receptacle portions defined by partitions inserted into the drop out box and by opening operation of the opening and closing devices.

Here, as disclosed in Japanese Unexamined Utility Model Publication 2-86903, in the conventional goods dropping out method, the opening and closing member corresponding to each individual goods receptacle portion defined in the drop out box by means of partitions is provided so that the opening and closing member corresponding to the individual goods receptacle portion is operated to open upon dropping out of the goods in each goods receptacle portion.

However, in the prior art, it has been required to provide the opening and closing member and the their driving portion for each of the goods receptacle portions. Accordingly, between the drop out devices for respectively different sizes of the goods as objects for dropping out and having different arrangement patterns of the goods receptacle portions defined in the drop out boxes, the installation condition of the opening and closing members and the driving portions therefore should be mutually different. Therefore, in the prior art, in order to enable dropping out of various sizes of goods, it becomes necessary to provide a plurality of kinds of drop out devices for respective sizes of the goods, which are differentiated not only in the arrangement of the partitions in the drop out boxes but also in the installation manner of the opening and closing members and the driving portions therefor, thus lowering efficiency of facility.

An object of the invention is to improve the efficiency of facility by enabling dropping out of various sizes of goods employing the drop out devices having common basic constructions.

(C) On the other hand, as disclosed in Japanese Unexamined Utility Model Publication No. 2-86903, the conventional picking device receives the goods in a plurality of goods receptacle portions defined in matrix form in the drop out box, moves a larger opening and closing member which can open and close the bottoms of respective goods receptacle portions simultaneously per one column, is moved per column, operates smaller opening and closing members arranged at the tip end of the larger opening and closing member and independently opening and closing the bottoms of respective individual goods receptacle portions to open and close and thus drops out the goods in respective goods receptacle portions onto the collecting conveyer or so forth.

Here, in the conventional goods dropping out method, when the number of goods left in the leading column among the columns in which the goods are maintained, is less than a necessary number, a number of the smaller opening and closing members corresponding to the number derived as a remainder after subtracting the maintained number of goods in the leading column and subtracting the number of goods per column (for example number of goods in n columns), are held open, and the larger opening and closing members of the leading column and n columns are moved simultaneously to enable the necessary number of goods to be dropped out.

On the other hand, in the conventional goods dropping out method, when the sizes of the goods to be dropped out are differentiated, the arrangement patterns of the goods receptacle portions defined in the drop out boxes are differentiated so that the sizes of the bottom openings of respective goods receptacle portions to be opened and closed by the smaller opening and closing members are differentiated. Then, it can be considered to improve the efficiency of the facility by adapting the length of the smaller opening and closing member in the motion direction of the larger opening and closing member to an arrangement pattern having an average length in that direction and by using the smaller opening and closing members of this length in common to the arrangement pattern of the other goods receptacle portions of different lengths in that direction.

However, the conventional goods drop out method, in which the smaller opening and closing member of an average length is to be used in common to various arrangement patterns of the goods receptacle portions, and the smaller opening and closing members and the larger opening and closing members are operated in the manner set forth above, is not efficient for the arrangement pattern having a large number of columns due to small size of the goods.

Namely, in the arrangement pattern having a large number of columns for small size goods, the tip end portions of the smaller opening and closing members can extend beyond the corresponding goods receptacle portions to partly block the bottoms of the goods receptacle portions in the adjacent column. As a result, when the larger opening and closing members are moved simultaneously for dropping out the goods, not all of the goods receptacle portions which are to be opened by the smaller opening and closing members can be opened sufficiently. Therefore, it becomes impossible to drop out with certainty a necessary total drop out number.

An object of the invention is to enable to drop out with certainty a necessary total number when the common configuration of the smaller opening and closing members are designed to be used in common for various arrangement patterns of the goods receptacle portions.

SUMMARY OF THE INVENTION

According to the present invention, a goods drop out device having goods receptacle portions defined in a drop out box and opening and closing devices for opening and closing the bottoms of the goods receptacle portions, comprises: the opening and closing devices each comprising an opening and closing member pivotable about a support shaft extending substantially in parallel to the bottom of the goods receptacle portion for opening and closing the bottom; a pushing rod contacting with the lower surface of the opening and closing member and moving toward and away from the lower surface; and an opening and closing cylinder device for driving the pushing rod and operating to close the bottom of the goods receptacle portion by pushing up the opening and closing member by the pushing rod.

According to another aspect of the present invention a goods dropping out method, in which goods are stored in a plurality of goods receptacle portions defined by partitioning walls inserted into a drop out box, and opening and closing devices provided on the bottoms of respective goods receptacle portions are operated to open to enable dropping out of the goods in respective goods receptacle portions, comprises the steps of: selecting insertion positions of the partitioning walls in the drop out box to modify an arrangement pattern of the goods receptacle portions in the drop out box; providing a plurality of smaller opening and closing members corresponding to a minimum interval of the partitioning walls to be inserted into the drop out box in parallel relationship to each other; and operating all of the smaller opening and closing members at least partly corresponding to the bottom of the goods receptacle portions upon dropping out the goods therefrom.

According to another aspect of the present invention, a goods drop out device defining a plurality of goods receptacle portions defined by partitioning walls which are inserted into a drop out box, having an opening and closing device at the bottom of each of the goods receptacle portions so that dropping out of the goods in the goods receptacle portions by opening operation of the opening and closing device, comprises: the partitioning walls having selectable insertion positions in the drop out box for modifying the arrangement pattern of the goods receptacle portions defined in the drop out box; and the opening and closing device including a plurality of smaller opening and closing members corresponding to the minimum interval of the partitioning walls inserted, in parallel relationship to each other; and upon dropping out of the goods from respective goods receptacle portions, opening all of the smaller opening and closing members at least partly corresponding to the bottom of the goods receptacle portions.

According to another aspect of the present invention, a goods dropping out method, in which goods are stored in a plurality of goods receptacle portions defined in a matrix fashion within a drop out box, a large opening and closing member which can simultaneously open and close the bottoms of respective goods receptacle portions in one column being moved per column, smaller opening and closing members provided on the tip end of the larger opening and closing member and capable of opening and closing the bottoms of respective goods receptacle portions independently are operated to open and close for enabling dropping out of goods in each goods receptacle portion, wherein the dropping out method comprises the steps of: when the number of goods maintained in a leading column where the goods remain is smaller than a required total number to be dropped out, initially operating all of the smaller opening and closing members to open to drop out the goods remaining in the leading column; when the required necessary number to be dropped out after dropping out of the leading column is in excess of a unit number of the column, moving the larger opening and closing member over corresponding columns while maintaining all of the smaller opening and closing members at an open condition for dropping out the goods per column; and moving the larger opening and closing member over one column while opening only a number of the smaller opening and closing members corresponding to the remaining necessary number to be dropped out and closing the remaining smaller opening and closing members after the foregoing drop out operation.

According to another aspect of the present invention, a goods dropping out method, in which goods are stored in a plurality of goods receptacle portions defined in a matrix fashion within a drop out box, a large opening and closing member which can simultaneously open and close the bottoms of respective goods receptacle portions in one column, and being moved per column, smaller opening and closing members provided on the tip end of the larger opening and closing member and capable of opening and closing the bottoms of respective goods receptacle portions independently are operated to open and close for enabling dropping out of goods in each goods receptacle portion, wherein the dropping out method comprises the steps of: when the number of goods maintained in a leading column where the goods is remain is smaller than a required total number to be dropped out, initially operating all of the smaller opening and closing members to open to drop out the goods remaining in the leading column; operating all of the smaller opening and closing members to close after dropping out of goods; when the required necessary number to be dropped out after dropping out of the leading column is in excess of a unit number of the column, moving the larger opening and closing member over only one column to repeat the foregoing operation for dropping out goods per column; and after the foregoing dropping out, operating only a number of the smaller opening and closing members corresponding to the remaining necessary number to be dropped out after the foregoing drop out operation.

According to another aspect of the present invention in the goods drop out method, there further includes a step, when the goods in a plurality of columns are to be dropped out, the smaller opening and closing members which are once opened for opening the bottom of the goods receptacle portions, are stopped for a preset period after dropping out in advance of operation of the smaller opening and closing members to close.

According to the present invention, the following effects can be attained.

According to the present invention, the pushing rods driven by the opening and closing cylinder devices contact the lower surfaces of the opening and closing members to close the bottom of the goods receptacle portions by pushing up the opening and closing members by the pushing rods and to open the bottom of the goods receptacle portions by pivoting due to the weights of the opening and closing members themselves in response to retraction of the pushing rods. The goods can be dropped out from the goods receptacle portions which are opened at the bottoms.

Accordingly, in the present invention, even when the opening and closing cylinder devices having a uniform stroke are employed, the opening and closing members of the different lengths can be opened and closed with certainly. Thus, by employing the opening and closing cylinder devices having a uniform stroke, the bottom opening and closing members for the goods receptacle portions having different bottom opening sizes can be opened and closed with certainly to improve efficiency of the facility.

According to the present invention, the following effect can be attained.

According to the present invention, when the sizes of the goods to be the objects for dropping out are different, the arrangement pattern of the goods receptacle portions defined in the drop out box is changed by changing the inserting positions of the partitioning walls in the drop out box, and the smaller opening and closing members to be operated to open upon dropping out of the goods are appropriately selected corresponding to variation of the arrangement patterns of the goods receptacle portions. Namely, by changing the insertion position of the partitioning walls and selection of the smaller opening and closing members to be opened, it becomes possible to drop out a variety of sizes of goods employing the drop out devices having the same basic construction for improving the efficiency of the facility.

According to the present invention, the manner of opening and closing operation of the smaller opening and closing members and the larger opening and closing member for dropping out the goods are as follows:

① When the number of goods in the leading column where the goods are maintained is smaller than the total number to be dropped out, all of the smaller opening and closing members are operated to open to drop out the goods maintained in the above-mentioned leading column.

② After dropping out in the above-mentioned ①, if the remaining necessary number to be dropped out exceeds the column units, the larger opening and closing member is moved over a corresponding number of columns while maintaining all smaller opening and closing members at an open position.

③ After dropping out in the above-mentioned ②, the larger opening and closing member is moved over one column while opening the smaller opening and closing members, the number of which corresponds to the remaining necessary number to be dropped out.

According to the present invention, the manner of opening and closing operation of the smaller opening and closing members and the larger opening and closing member for dropping out the goods are as follows:

① When the number of goods in the leading column where the goods are maintained is smaller than the total number to be dropped out, all of the smaller opening and closing members are operated to open to drop out the goods maintained in the above-mentioned leading column.

② After dropping out in the above-mentioned ①, all the smaller opening and closing members are operated to close, and the larger opening and closing member is moved over one column.

③ After dropping out in the above-mentioned ①, if the remaining necessary number to be dropped out exceeds the column units, the larger opening and closing member is moved over one column to repeat the above-discussed operation for dropping out the goods per column.

④ After dropping out in the above-mentioned ③, only smaller opening and closing members, the number of which corresponds to the remaining necessary number to be dropped out, are opened.

In the present invention, when the goods are dropped out from the goods receptacle portions, the smaller opening and closing members corresponding to those goods receptacle portions are always set to an open condition. Accordingly, even when the same configuration of the smaller opening and closing members (for example, the smaller opening and closing member of an average length) is employed in common to various arrangement patterns of the goods receptacle portions and when it is applied to the arrangement pattern having a large number of columns due to small size of the goods, the tip ends of the smaller opening and closing members will never block the goods receptacle portions in the adjacent column even partly to enable to drop out with certainly a total necessary number of goods to be drop out.

In the present invention, when the goods in a plurality of columns are to be dropped out, in advance of operation for closing the smaller opening and closing members which are once opened for dropping out the corresponding goods for opening the bottom of the goods receptacle portions, the smaller opening and closing members are stopped in their open position for a predetermined period of time after dropping out. By this, the goods to be dropped out will never be clamped by the smaller opening and closing member and are permitted to be dropped out with certainly.

It should be noted that the period for stopping the smaller opening and closing members in their open position corresponds to a dropping out period of the goods.

BRIEF DESCRIPTION OF THE DRAWINGS

FIG. 7 is an illustration showing various arrangement patterns of the drop out devices;

DESCRIPTION OF THE PREFERRED EMBODIMENTS

Figure 1:
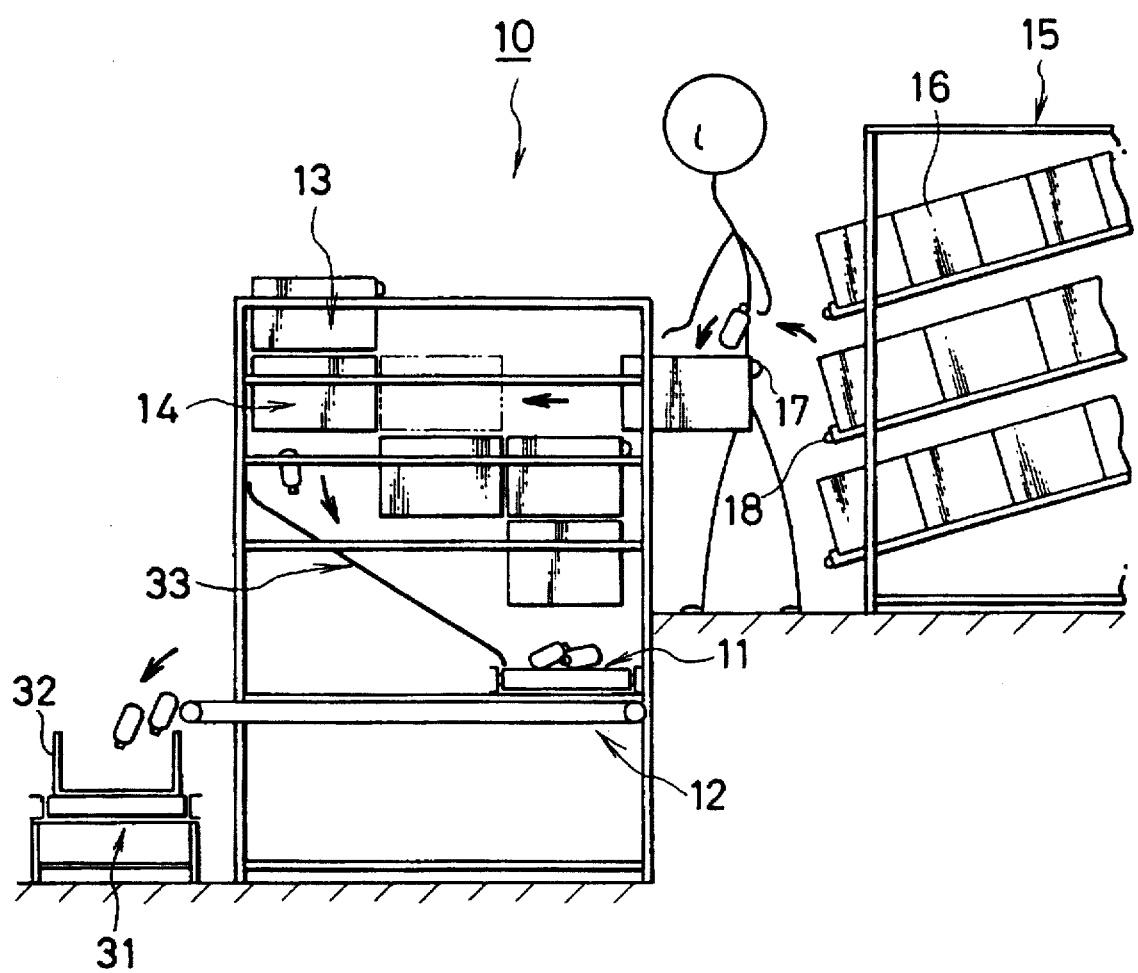
FIG. 1 is a fragmentary illustration showing one embodiment of a picking device, to which the present invention is applied.
Figure 2:
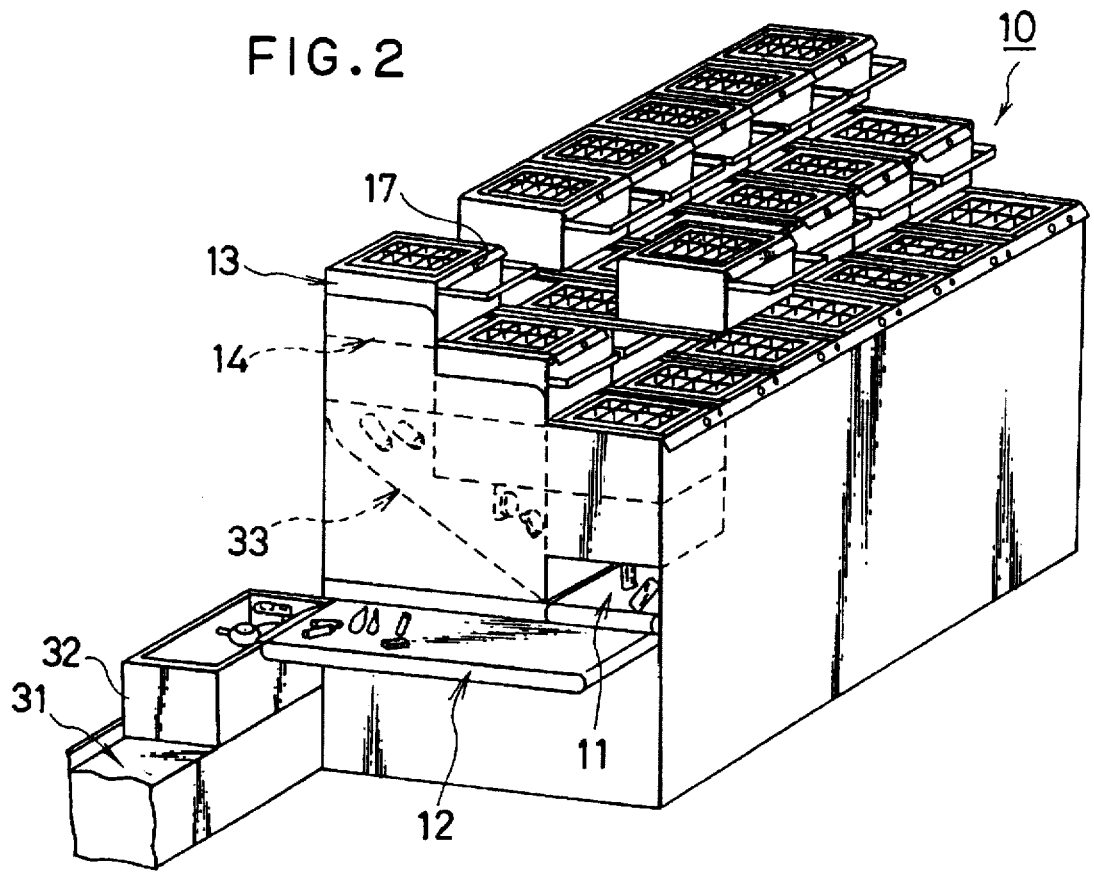
FIG. 2 is a perspective view of the major portion of FIG. 1.
Figure 3:
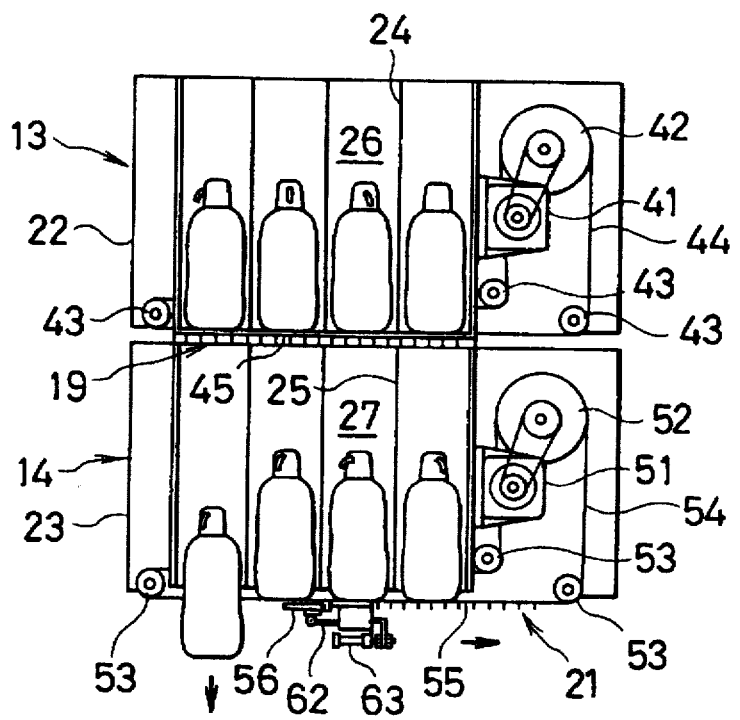
FIG. 3 is a fragmentary illustration showing a reservoir tank and a drop out device.

As shown in FIGS. 1–3, a picking device 10 is formed as a unit of a plurality of sets (for example, 20 sets) of reservoir devices 13 corresponding to each of plurality of kinds of goods (for example 20 kinds), and a drop out devices 14 arranged with respect to a collecting conveyer 11 and a supplying conveyer 12.

Consequently, the picking device 10 is arranged with three sets of reservoir devices 13 and the drop out devices 14 at three stages of proximal side, intermediate side and the distal side at a position opposing to a flow shelf 15. Respective reservoir devices 13 at the distal and intermediate side stages are adapted to move frontwardly, i.e. toward the flow shelf 15 above those in the intermediate and proximal side. Namely, in the picking device 10, a worker withdraws the reservoir device 13 which becomes empty from an original position toward the flow shelf 15 upon transferring the goods in goods box 16 to the flow shelf 15, and pushes the reservoir device 13, to which the goods are transferred, into the original position after transferring the goods into the reservoir device 13 at the position withdrawn toward the flow shelf 15.

It should be noted that the picking device 10 includes a transfer demand indicator 17 at the front face of each reservoir device 13 so that the fact that the reservoir becomes empty is indicated to the worker by flashing of the transfer demand indicator 17. At the same time, a transfer goods indicator 18 provided on the corresponding compartment of the flow shelf 15 also flashes.

As set forth above, the picking device 10 is arranged with the drop out devices 14 beneath the reservoir devices 13 so that shutter devices 21 of the drop out devices 14 are operated to open to drop out a desired number of goods onto the collecting conveyer 11 after opening operation of shutter devices 19 of the reservoir devices 13 for transferring all goods transferred to the reservoir device 13 to the drop out device 14 at the downstream position.

In the picking device 10, respective ones of the reservoir devices 13 and the drop out devices 14 are provided with partitioning walls 24, 25 inserted into reservoir tanks 22 and drop out boxes 23 for defining a plurality of goods receptacle portions 26, 27. The goods stored in each goods box 16 stored in each compartment of the flow shelf 15 in random fashion or in a predetermined arrangement, are manually transferred by the worker into each goods receptacle portion 26 of the reservoir device 13. The goods transferred into the reservoir device 13 are then transferred to each goods receptacle portion 27 of the drop out device 14 by opening control of the shutter device 19 as set forth above. Then, the goods transferred to the drop device 14 are dropped out per the goods receptacle portion 27 by opening control of the shutter 21 as set forth above. It should be noted that the shutter devices 19 and the shutter devices 21 are controlled by a picking control device (not shown) provided in the picking device 10.

The picking device 10 is provided with an orienting device as discussed below in order to supply the goods dropped out from a plurality (for example, 20) of the drop out devices 14 forming one unit in the manner as set forth above into a container 32 on a container transporting line 31 in oriented fashion.

Namely, the orienting device comprises a shoot 33 arranged at the lower side of the drop out devices 14 forming one unit along all of the drop out devices 14 of the picking device 10, the above-mentioned collecting conveyer 11 being arranged along the drop out device 14 at the downstream of the chute 33 and the above-mentioned supply conveyer 12 being arranged downstream of the collecting conveyer 11 for collecting the goods dropped out onto the collecting conveyer 11. In the orienting device, the goods for one container which are dropped out from respective drop out devices 14 are transferred to the collecting conveyer 11 via the chute 33 and temporarily maintained on the collecting conveyer 11. After temporarily placing on the collecting conveyer 11 in the standby state, given the condition that the supply conveyer 12 becomes empty, the collecting conveyer 11 is driven to transfer the goods on the collecting conveyer 11 onto the supply conveyer 12. Then, when the container 32 on the container transporting line 31 is discriminated that it is the container to put the above-mentioned goods based on a bar code put on the container 32, the container 32 is stopped in front of the supply conveyer 12. The supply conveyer 12 is then driven to supply the goods on the supply conveyer 12 into the container 32.

The detail of the reservoir device 13 and the drop out device 14 are as follows:

The reservoir device 13 has a plurality of goods receptacle portions 26 defined in a matrix form of n columns and k rows by the partitioning walls 24 inserted into the reservoir tank 22. To this end, the reservoir tank 22 has a large number of partitioning wall inserting slits similarly the drop out box 23 illustrated in FIG. 5. When the size of the goods to be the objects for dropping out is differentiated, the arrangement pattern of the goods receptacle portions 26 defined in the reservoir tank 22 can be changed in the same manner as the drop out box 23 illustrated in FIG. 7 by changing the inserting positions of the partitioning walls 24 in the common reservoir tank 22.

On the other hand, in the reservoir device 13, the bottom of the goods receptacle portions 26 defined in the reservoir tank 22 is designed to be opened and closed by the above-mentioned shutter device 19. As shown in FIG. 3, the shutter device 19 comprises a pair of left and right large diameter gears 42 driven by a motor 41 and three sets of pairs of left and right smaller diameter idler gears 43 arranged at insides of left and right side plates of the reservoir tank 22 and a plurality of struts are sequentially supported on parts of a pair of endless circulating chains 44 engaged with these gears 42 and 43 to form an opening and closing member 45. Namely, the shutter device 19 moves the opening and closing member 45 in column direction (see FIG. 6) in response to driving of the motor 41 under control of the picking control device as set forth above and thus enables opening control of all goods receptacle portions 26 in the reservoir tank 22. As a result, it becomes possible to transfer all goods in the reservoir tank 22 into the lower side drop out device 14.

Figure 5:
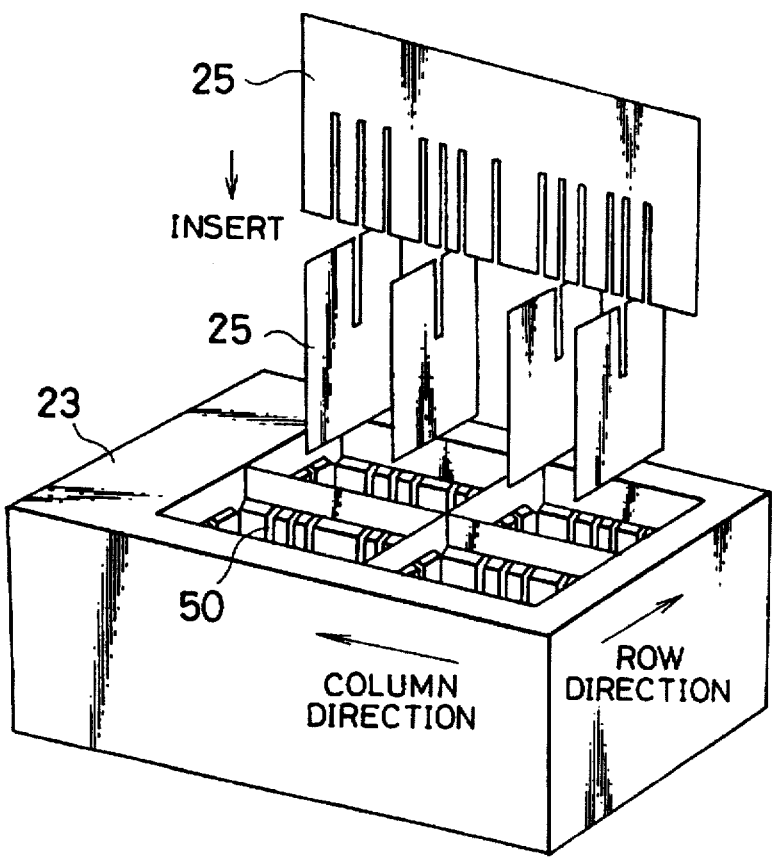
FIG. 5 is a perspective view of a partitioning wall of the drop out device.
Figure 6:
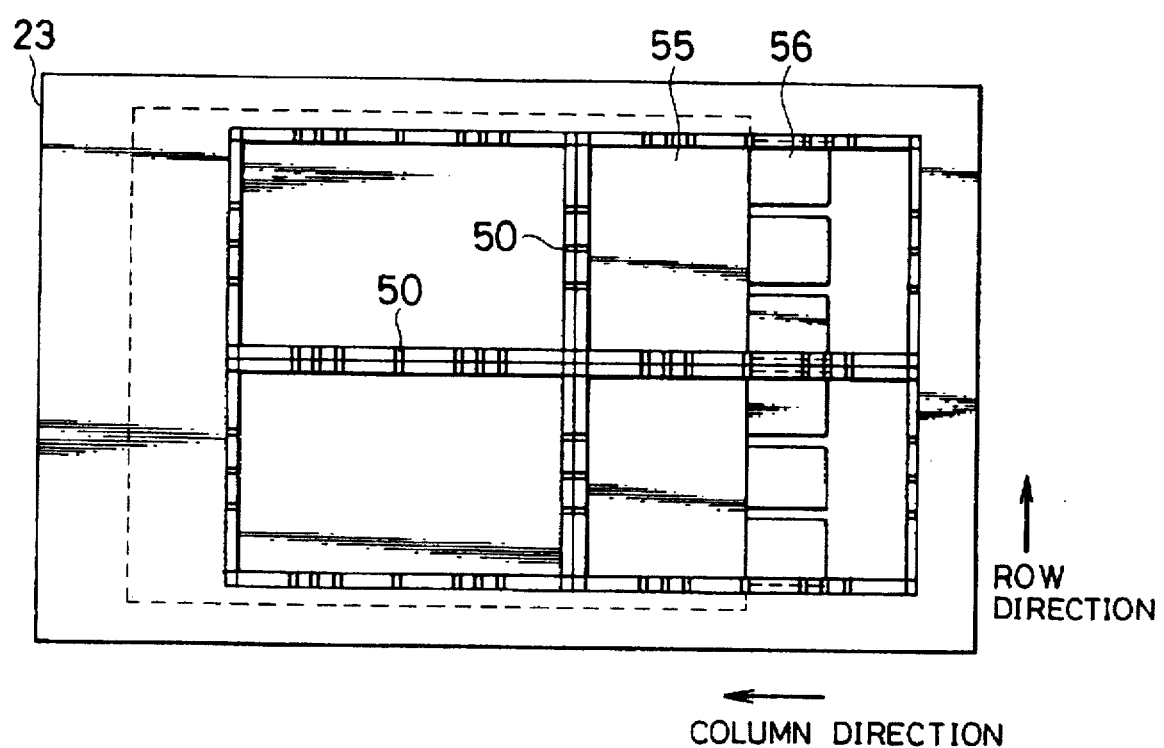
FIG. 6 is a plan view showing the drop out device.

The drop out device 14 has a plurality of goods receptacle portions 27 in the matrix form of n columns and k rows corresponding to the goods receptacle portions 26 formed in the upper side reservoir device 13, defined by the partitioning walls 25 inserted into the drop out box 23. The drop out box 23 has a large number of partitioning wall receptacle slits 50, as shown in FIGS. 5 and 6. When the sizes of the goods to be the objects for dropping out are different, the arrangement patterns of the goods receptacle portions 27 defined in the drop out box 23 can be changed as shown in FIG. 7 by changing the inserting positions of the partitioning walls 25 in the common drop out box 23.

Namely, depending upon the size (l×w) of the goods to be the objects for dropping out, a pattern capable of storing the goods and having a maximum frequency of storing is selected among various patterns of FIG. 7.

Furthermore, in the drop out device 14, the bottom of the goods receptacle portions 27 formed in the drop out box 23 can be opened and closed by the shutter device 21 set forth above. As shown in FIG. 3, the shutter device 21 comprises a pair of left and right large diameter gears 52 driven by a motor 51 and three sets of pairs of left and right smaller diameter idler gears 53 arranged at insides of left and right side plates of the drop out box 23. A larger opening and closing member 55 and a plurality of smaller opening and closing members 56 are provided on a pair of endless circulating chains 54 engaged with these gears 52 and 53.

The large opening and closing member 55 is formed by sequentially supporting a plurality of struts on parts of the chains 54. Namely, the shutter device 21 moves the large opening and closing member 55 in the row direction (see FIG. 6) in response to driving of the motor 51 under control of the picking control device as set forth above to simultaneously open the bottoms of the goods receptacle portions 27 per one column.

Figure 4:
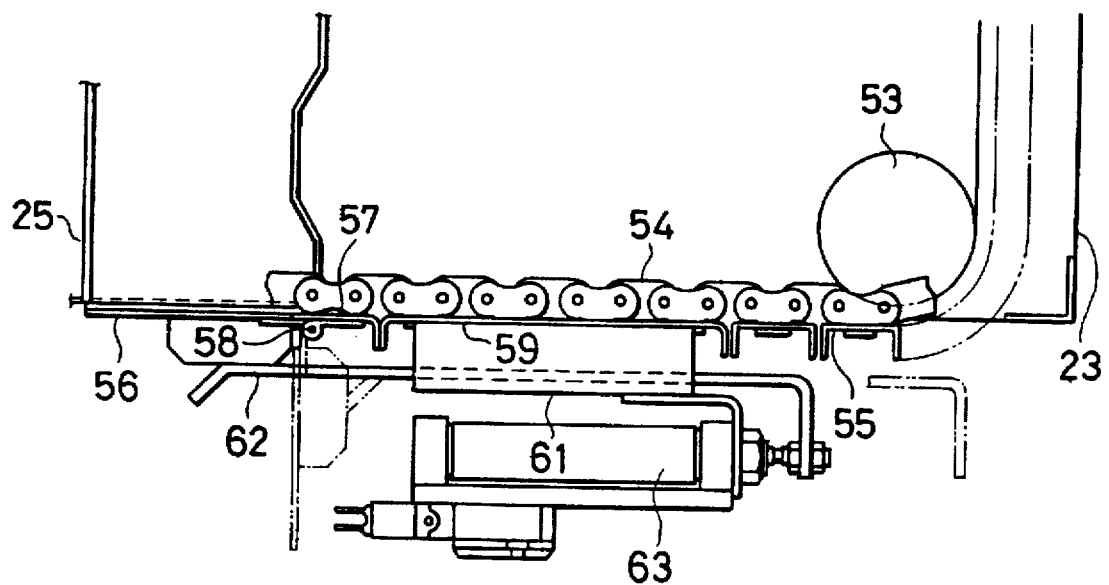
FIG. 4 is a sectional view showing an opening and closing device in the drop out device.

On the other hand, as shown in FIG. 4, respective smaller opening and closing members 56 are supported by supporting members 57 provided on the chain 54 for arranging at the tip end of the larger opening and closing member 55 and so as to be supported in parallel relationship to each other and pivoted about a support shaft 58 extending substantially parallel to the bottoms of the goods receptacle portions 27 for opening and closing the bottoms. By a pushing rod guide 61 supported by a support member 59 provided on the chain 54, pushing rods 62 and opening and closing cylinder devices 63 corresponding to respective smaller opening and closing members 56 are supported. The pushing rod 62 contacts the lower surface of the smaller opening and closing member 56 and moves toward and away from the lower surface under the guidance of the pushing rod guide 61. The opening and closing cylinder device 63 drives the pushing rod 62 to push up the smaller opening and closing member 56 by the pushing rod 62 for closing motion of the bottom of the goods receptacle portion 27. It should be noted that the smaller opening and closing member 56 opens the bottom of the goods receptacle portion 27 by rotating due to its own weight when the opening and closing cylinder device 63 retracts the pushing rod 62. By this, the smaller opening and closing member 56 can open and close the bottom of the corresponding goods receptacle portion 27 independently.

It should be noted that the smaller opening and closing member 56 is sized corresponding to a minimum interval of the partitioning walls 25 inserted in the drop out box 23, and a plurality of the smaller opening and closing members 56 of the relevant size are provided in parallel. For instance, assuming the minimum interval of the above-mentioned partitioning walls 25 is w6 (see FIG. 7) corresponding to 6 rows arrangement pattern of FIG. 8, the small opening and closing members 56 of the size in the column direction coincident with w6 (see FIG. 6) are employed. Then, a total of 6 smaller opening and closing members 56 are arranged on the tip end of the larger opening and closing member 55.

Figure 8:
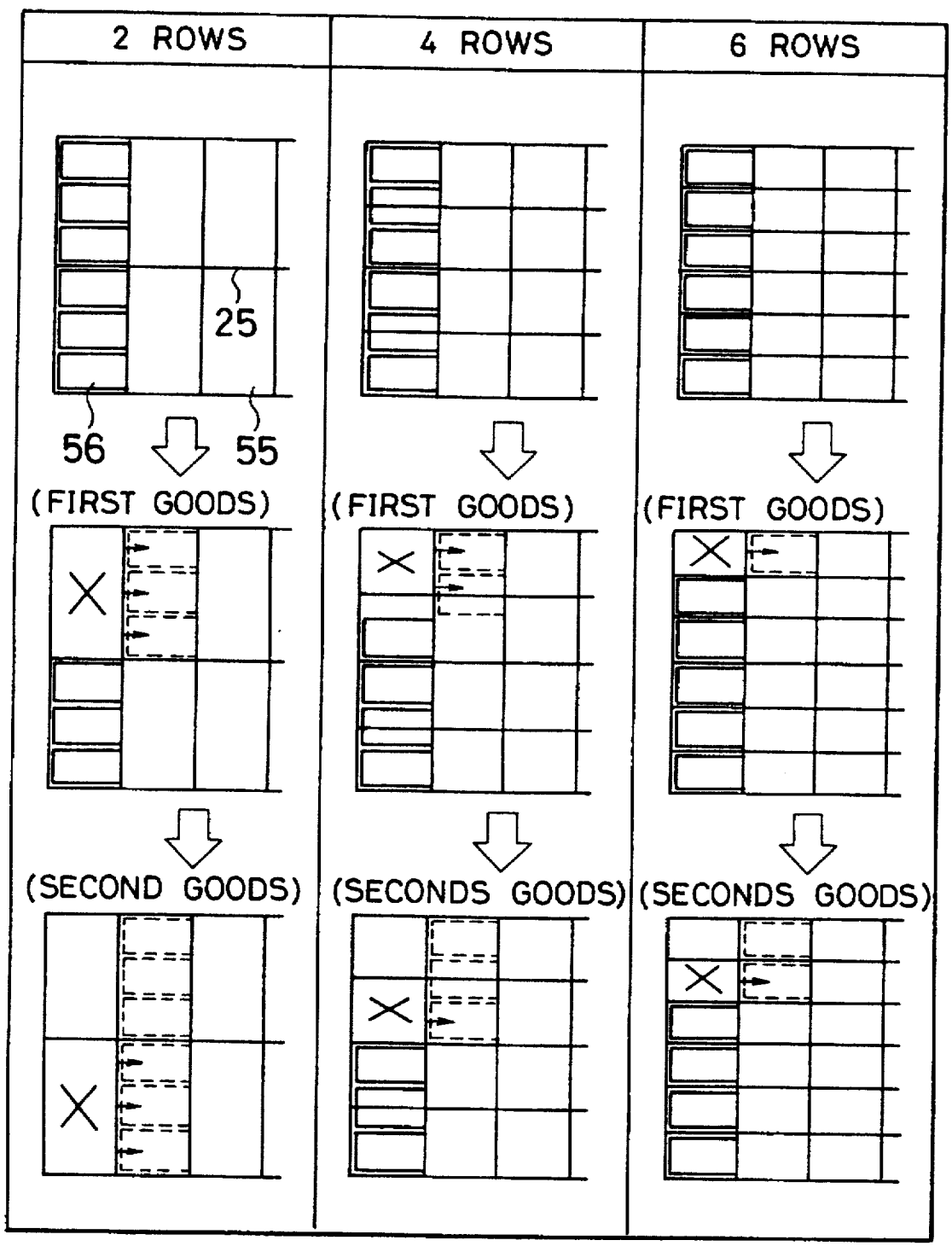
FIG. 8 is an illustration showing opening and closing operation of the opening and closing device.

Here, a discussion follows for a concrete manner of use of the drop out device 14, given by the following steps (1) and (2) (see FIG. 8).

(1) Depending upon the size (l×w) of the goods to be the objects for dropping out, the inserting positions of the partitioning walls 25 are selected to vary the arrangement pattern of the goods receptacle portions 27 defined in the drop out box 23. For example, depending upon variation of w as large, medium and small in the sizes (l×w) of the goods, 2 rows, 4 rows and 6 rows patterns of FIG. 8 can be set respectively.

It should be noted that, at the same time, the inserting positions of the partitioning walls 24 in the reservoir tube 22 are selected also in the reservoir device 13 so that the arrangement pattern of the goods receptacle portions 26 similar to that in the drop out device 14 is set.

(2) Upon dropping out of the goods from respective goods receptacle portions 27, all of the smaller opening and closing members 56 at least partly corresponding to the bottoms of the goods receptacle portions 27 are operated to open by actuation of the opening and closing cylinder devices 63 under control of the shutter device 21 by the picking control device set forth above.

For instance, in case of the 2 row arrangement pattern of FIG. 8, by controlling opening by actuation of the corresponding opening and closing cylinder devices 63 for 3 smaller opening and closing members 56 corresponding to the bottom of the relevant goods receptacle portion 27, one good can be dropped out.

On the other hand, in case of the 4 rows pattern in FIG. 8, by controlling opening by actuation of the corresponding opening and closing cylinder devices 63 for 2 smaller opening and closing members 56 (one of the smaller opening and closing members 56 corresponds to half of the goods receptacle portion 27) corresponding to the bottom of the goods recetacle portion 27, one good can be dropped out.

On the other hand, in case of the 6 rows pattern in FIG. 8, by controlling opening by actuation of the corresponding opening and closing cylinder devices 63 for only one smaller opening and closing member 56 corresponding to the bottom of the goods recetacle portion 27, one good can be dropped out.

It should be noted that, when 2 goods are to be dropped out in the 2 rows arrangement pattern of FIG. 8 for example, all of 6 smaller opening and closing members 56 may be simultaneously operated to open by actuating corresponding opening and closing cylinder devices 63.

After dropping out the goods in all of the goods receptacle portions 27 in 1 column through the above-mentioned step (2), the larger opening and closing member 55 is shifted for one column by actuation of the motor 51 while all smaller opening and closing members 56 are operated for closing. Subsequently, the above-mentioned process of (2) will be repeated as required.

Next, a discussion will be given for the operations of the above-mentioned embodiment.

In the above-mentioned embodiment, the pushing rods 62 driven by the opening and closing cylinder devices 63 contact the lower surfaces of the smaller opening and closing members 56 to close the bottom of the goods receptacle portions 27 by pushing up the smaller opening and closing members 56 by the pushing rods 62 and to open the bottom of the goods receptacle portions 27 by pivoting due to the weights of the smaller opening and closing members 56 themselves in response to retraction of the pushing rods 62. The goods can be dropped out from the goods receptacle portions 27 which are opened at the bottom.

Accordingly, in the above-mentioned embodiment, even when the opening and closing cylinder devices 63 having a uniform stroke are employed, the smaller opening and closing members 56 of the different lengths can be opened and closed with certainly. Thus, by employing opening and closing cylinder devices 63 having a uniform stroke, the bottom opening and closing members for the goods receptacle portions 27 having different bottom opening sizes can be opened and closed with certainly to improve efficiency of the facility.

On the other hand, according to the embodiment set forth above, when the sizes of the goods to be the objects for dropping out are different, the arrangement pattern of the goods receptacle portions 27 defined in the drop out box 23 is changed by changing the inserting positions of the partitioning walls 25 in the drop out box 23, and the smaller opening and closing members 56 to be operated to open upon dropping out of the goods are appropriately selected corresponding to variation of the arrangement patterns of the goods receptacle portions 27. Namely, by changing of the insertion position of the partitioning walls 25 and selection of the smaller opening and closing members 56 to be opened and closed, it becomes possible to drop out a variety of sizes of goods employing drop out devices 14 having the same basic construction for improving the efficiency of the facility.

Furthermore, in the drop out device 14, the smaller opening and closing members 56 having sufficient length L (average length or maximum length of 1 segments of all arrangement patterns or so forth) for preventing the goods from falling off the goods receptacle portion 27 defined in the cut out box 23 are arranged in parallel relationship. For example, with respect to 6 rows and 4 columns and 6 rows and 12 columns arrangement patterns of FIG. 9, the smaller opening and closing member 56 having the size in the column direction (see FIG. 6) coincident with w6, and the size in the row direction (see FIG. 6) being above-mentioned L is employed so that a total of 6 smaller opening and closing members 56 are arranged at the tip end of the larger opening and closing member 55.

Figure 9:
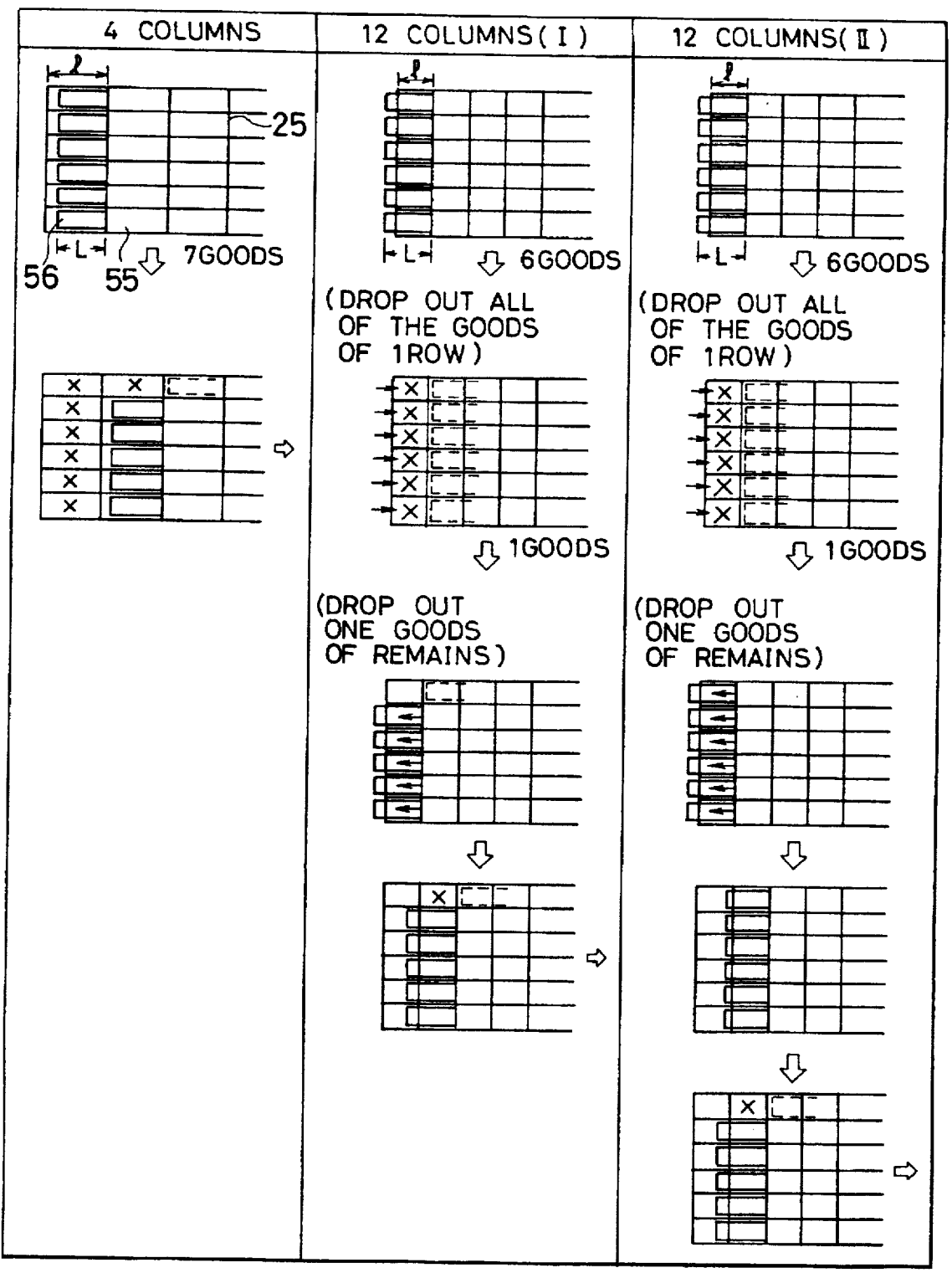
FIG. 9 is a illustration showing another opening and closing operation of the opening and closing device.

Here, a discussion follows for concrete manner of use of the drop out device 14, given by the following steps (1) and (2) (see FIG. 9).

(1) Depending upon the size (l×w) of the goods to be the objects for dropping out, the inserting positions of the partitioning walls 25 are selected to vary the arrangement pattern of the goods receptacle portions 27 defined in the drop out box 23. For example, depending upon variation of 1 as large and small in the sizes (l×w) of the goods, the arrangement pattern, such as 6 rows and 4 columns, 6 rows and 12 columns of FIG. 9 or so forth, is set respectively.

It should be noted that, at the same time, the inserting positions of the partitioning walls 24 in the reservoir tank 22 are selected also in the reservoir device 13 so that the arrangement pattern of the goods receptacle portions 26 similar to that in the drop out device 14 is set.

(2) Upon dropping out of the goods from respective goods receptacle portions 27, and when the number of the remaining goods in the leading column is smaller than the required number, by the control of the shutter device 21 by the picking control device as set forth above, all of the smaller opening and closing members 56 are initially operated to open to drop out remaining goods in the leading column and held in an open condition for a preset period (necessary to pass the goods). Subsequently, when the remaining necessary number of goods to be dropped out is greater than the number of goods in the column, the larger opening and closing member 55 is moved over corresponding number of columns while maintaining all the smaller opening and closing members 56 in the open condition to drop out the goods in the columns. Thereafter, the larger opening and closing member 55 is moved over one column while the smaller opening and closing members 56 in a number corresponding to the remaining necessary number of goods to be dropped out are held open and the other smaller opening and closing members 56 are closed.

For example, in case of the 4 columns arrangement pattern of FIG. 9 and assuming the number of the goods to be dropped out is 7, all of the smaller opening and closing members 56 are initially operated to open for dropping out 6 goods in the leading column. Subsequently, only one smaller opening and closing member 56, corresponding to the remaining necessary number (1) of goods to be dropped out is opened and the other smaller opening and closing members 56 are closed. In this condition, the larger opening and closing member 55 is shifted over one column to drop out 1 good corresponding to the smaller opening and closing member 56 which is held in an open condition.

On the other hand, even in the 12 columns arrangement pattern of FIG. 9 and assuming the number of goods to be dropped out is 7, as illustrated in the column of 12 columns (I) of FIG. 9 and similar to the above, all of the smaller opening and closing members 56 are initially operated to open for dropping out 6 goods in the leading column and maintain the open condition for the predetermined period of time. Subsequently, only one smaller opening and closing member 56 corresponding to the remaining necessary number (1) of goods to be dropped out is opened and the other smaller opening and closing members 56 are closed. In this condition, the larger opening and closing member 55 is shifted over one column to drop out 1 goods corresponding to the smaller opening and closing member 56 which is held in an open condition.

It should be noted that, in the 4 columns arrangement pattern of FIG. 9, the length L of the smaller opening and closing member 56 is smaller than the length l of the goods receptacle portion 27. Therefore, when the necessary number to be dropped out is 7, it is possible to open only one smaller opening and closing member 56 and move the large opening and closing member 55 over one column for dropping out all 7 goods in one action, as an alternative of the above-mentioned method of the invention.

However, in case of the 12 columns arrangement pattern of FIG. 9, since the length L of the smaller opening and closing member 56 is greater than the length l of one goods receptacle portion 27, the problems discussed with respect to the prior art may arise unless the method of the present invention is followed. That is, 6 smaller opening and closing members 56 held in their closed position have the tip ends thereof extending over the corresponding goods receptacle portions 27 to partly block the bottoms of the adjacent 6 goods receptacle portions 27 to make dropping out of a total of 6 goods from the 6 goods receptacle portions 27 in the adjacent column impossible.

According to the above-mentioned embodiment, the opening and closing process of the smaller opening and closing members 56 and the larger opening and closing member 55 for dropping out the goods are as follows:

① When the number of goods in the leading column where the goods are maintained is smaller than the total number to be dropped out, all of the smaller opening and closing members 56 are operated to open to drop out the goods maintained in the above-mentioned leading column.

② After dropping out in the above-mentioned step ①, if the remaining necessary number to be dropped out exceeds the column units, the larger opening and closing member 55 is moved over corresponding number of columns while maintaining all smaller opening and closing members 56 in their open position.

③ After dropping out in the above-mentioned step ②, the larger opening and closing member 55 is moved over one column while opening a number of smaller opening and closing members 56 which corresponds to the remaining necessary number to be dropped out.

It should be noted that among the concrete use procedure steps (1) and (2) of the drop out device as set forth above, (2) can be replaced with the following processes.

Namely, upon goods being dropped out in the above-mentioned (2), when the remaining number of goods maintained in the leading column is smaller than the total number to be dropped out, all of the smaller opening and closing members 56 are operated to open and maintained in an open condition for the predetermined period (necessary for passing the goods). Subsequently, operating all of the smaller opening and closing members 56 to close, the larger opening and closing member 55 is moved over only one column. After dropping out the goods in this column, if the remaining necessary number to be dropped out is in excess of the column units, the above-mentioned operation is repeated for corresponding column units again to drop out the goods in the column unit. Subsequently, a number of the smaller opening and closing members 56 corresponding to the remaining necessary number to be dropped out are operated to open.

For example, in the 12 columns arrangement pattern of FIG. 9 and assuming the number of goods to be dropped out is 7, as illustrated in the column of 12 columns (II) of FIG. 9, all of the smaller opening and closing members 56 are initially operated to open for dropping out 6 goods in the leading column. After maintaining the open condition for the predetermined period of time, all of the smaller opening and closing members are operated to close and the larger opening and closing member is shifted over one column. Subsequently, only a number of the smaller opening and closing members 56 corresponding to the remaining necessary number (1) to be dropped out is opened and the other smaller opening and closing members 56 are closed.

In the above-mentioned embodiment, the opening and closing process of the smaller opening and closing members 56 and the larger opening and closing member 55 for dropping out the goods are as follows:

① When the number of goods in the leading column where the goods are maintained is smaller than the total number to be dropped out, all of the smaller opening and closing members 56 are operated to open to drop out the goods maintained in the above-mentioned leading column.

② After dropping out in the above-mentioned step ①, all the smaller opening and closing members 56 are operated to close, and the larger opening and closing member 55 is moved over 1 column.

③ After dropping out in the above-mentioned step ①, if the remaining necessary drop out number exceeds the column units, the larger opening and closing member 55 is moved over one column to repeat the above-discussed operation for dropping out the goods per column.

④ After dropping out in the above-mentioned step ③, only a number of the smaller opening and closing members 56 which corresponds to the remaining necessary number to be dropped out are opened.

Namely, in each of the above-mentioned embodiments, when the goods are dropped out from the goods receptacle portions 27, the smaller opening and closing members 56 corresponding to those goods receptacle portions 27 are always set to the open condition. Accordingly, even when the same configuration of the smaller opening and closing members 56 (for example, smaller opening and closing members of an average length) is employed in common to various arrangement patterns of the goods receptacle portions 27 and when it is applied to the arrangement pattern having a large number of columns due to small size of the goods, the tip ends of the smaller opening and closing members 56 will never block the goods receptacle portions 27 in the adjacent column even partly to enable the total necessary number of goods to be dropped out with certainly.

On the other hand, in each of the above-mentioned embodiments, when the goods in a plurality of columns are to be dropped out, in advance of an operation for closing the smaller opening and closing members 56 which are once opened for dropping out the corresponding goods for opening the bottom of the goods receptacle portions 27, the smaller opening and closing members 56 are stopped at open positions for the predetermined period of time after dropping out. By this, the goods to be dropped out will never be clamped by the smaller opening and closing member 56 and so are permitted to be dropped out with certainly.

It should be noted that, as the concrete manner of use of the drop out device 14, it is possible to employ a use method as discussed in (A) and (B) set out below a combination the use method discussed in terms of FIG. 8 and the use method discussed in terms of FIG. 9.

(A) A method of dropping out goods as a combination of the following steps ① to ④

① to store the goods in a plurality of goods receptacle portions defined in the form of matrix by partitioning walls inserted into the drop out box, operating the opening and closing devices provided on the bottom of each goods receptacle portion to open, and to thus enable dropping out of the goods in each goods receptacle portion;

② to move the large opening and closing member which can open and close the bottom of the goods receptacle portions in 1 column simultaneously by the opening and closing device, to operate the smaller opening and closing members which are arranged at the tip end of the larger opening and closing member and can open and close the bottom of each goods receptacle portions independently to open and close, and thus enable drop out of the goods in each goods receptacle portion;

③ to select the inserting portions of the partitioning walls into the drop out box to change the arrangement pattern of the goods receptacle portions defined in the drop out box, to provide a plurality of smaller opening and closing members corresponding to the minimum interval of the partitioning walls to be inserted into the drop out box in parallel relationship, and to operate all of the smaller opening and closing members at least partly corresponding to the bottom of the goods receptacle portions upon dropping out the goods from he goods receptacle portions;

④ when the number of goods maintained in the leading column is smaller than the total necessary number to be dropped out, to initially operate all of the smaller opening and closing members to open for dropping out the goods remaining in the leading column, when the remaining necessary number to be dropped out exceeds the column unit number, to move the larger opening and closing member over the corresponding column units while maintaining all of the smaller opening and closing members open to drop out the goods in those column units, and after dropping out set forth above, to move the larger opening and closing member over 1 column while keeping open a number of the smaller opening and closing members corresponding to the remaining necessary number to be dropped out and operating the other smaller opening and closing members to close.

(B) A method of dropping out goods as a combination of the following steps ① to ④

① to store the goods in a plurality of goods receptacle portions defined in the form of matrix by partitioning walls inserted into the drop out box, operating the opening and closing devices provided on the bottom of each goods receptacle portion to open, and to thus enable drop out of the goods in each goods receptacle portion;

② to move the large opening and closing member which can open and close the bottom of the goods receptacle portions in 1 column simultaneously by the opening and closing device, to operate the smaller opening and closing members which are provided at the tip end of the large opening and closing member and can open and close the bottom of each goods receptacle portions independently to open and close, and thus enable drop out of the goods in each goods receptacle portion;

③ to select the inserting portions of the partitioning walls in the drop out box to change the arrangement pattern of the goods receptacle portions defined in the drop out box, to provide a plurality of smaller opening and closing members corresponding to the minimum interval of the partitioning walls to be inserted into the drop out box in parallel relationship, and to operate all of the smaller opening and closing members at least partly corresponding to the bottom of the goods receptacle portions for opening upon dropping out of the goods from the goods receptacle portions;

④ when the number of goods maintained in the leading column is smaller than the total necessary number to be dropped out, to initially operate all of the smaller opening and closing members to open for dropping out the goods remaining in the leading column and thereafter operate all smaller opening and closing members to close, when the remaining necessary number to be dropped out exceeds the column unit number, to move the larger opening and closing member over the corresponding column units while maintaining all of the smaller opening and closing members open to drop out the goods in those column units, and after dropping out set forth above, to move the larger opening and closing member over only one column while operating a number of the smaller opening and closing members corresponding to the remaining necessary number to be dropped out to open.

It should be noted that, in ④ of (A) and ④ of (B) set forth above, when goods are to be dropped out over a plurality of columns, the smaller opening and closing members which have been opened for opening the bottom of the goods receptacle portions for dropping out the goods may be stored at an open position for the predetermined period after dropping out in advance of a closing operation of the smaller opening and closing members.

As set forth, according to the present invention, a facility efficiency can be improved by employing the opening and closing cylinder devices having uniform stroke length and assuring opening and closing of the bottom opening and closing members for the goods receptacle portions having different bottom opening sizes.

On the other hand, according to the present invention, employing the drop out device having a common basic construction, it is enabled to drop out a variety of sizes of goods to improve the efficiency of facility.

Also, according to the present invention, when an identical configuration of the smaller opening and closing members are employed in common to various arrangement patterns of the goods receptacle portions, it makes possible to drop out with certainly a total necessary number to be dropped out.

I claim:

1. A method of dropping out goods, in which goods are stored in a plurality of goods receptacle portions defined by partitioning walls inserted into a drop-out box defined at least by side walls, and an opening and closing device provided on bottoms of the goods receptacle portions are operated to open to enable dropping out of the goods from respective goods receptacle portions, the method comprising the steps of:

selecting insertion positions of said partitioning walls in said drop-out box to selectively modify an arrangement pattern of said goods receptacle portions in said drop-out box;

providing said opening and closing device with a plurality of smaller opening and closing members corresponding to a minimum interval of said partitioning walls to be inserted into said drop out box in parallel relationship to each other;

determining the insertion position of the partitioning walls in said drop-out box such that in at least one selected arrangement a single one of the smaller opening and closing members corresponds to the bottoms of both of adjacent goods receptacle portions defined in said arrangement pattern; and operating all of said smaller opening and closing members at least partly corresponding to the bottom of respective goods receptacle portions upon dropping out of the goods from the respective goods receptacle portions.

2. A method according to claim 1, wherein said opening and closing device includes a large opening and closing member covering all of the goods receptacle portions in a row, with the smaller opening and closing members positioned at a tip end of said large opening and closing member, and further comprising the steps of:

moving said large opening and closing member when it is desired to drop out goods from all goods receptacle portions in a row, and selectively moving respective ones of said smaller opening and closing members when it is desired to drop out goods from only some of the goods receptacle portions in a row.

3. A method according to claim 2, further comprising the step of moving said larger opening and closing member in a direction along the bottoms of said goods receptacle portions to permit dropping out of the goods from the goods receptacle portions of an entire row.

4. A method according to claim 1, wherein said smaller opening and closing members are pivotally mounted between a closing position in blocking relation to said goods receptacle portions and an open position which permits dropping out of the goods from the respective goods receptacle portions, and further comprising the step of selectively opening the respective goods receptacle portions by providing that the respective smaller opening and closing members are pivoted to the open position.

5. A method according to claim 4, further comprising the steps of:

blocking said smaller opening and closing members to hold the smaller opening and closing members in said closed position; and unblocking said smaller opening and closing members to permit the smaller opening and closing members to pivot by gravity to said open position to drop out the goods from said goods receptacle portions.

6. A method according to claim 5, wherein said step of blocking includes the step of extending a piston rod into blocking relation with said smaller opening and closing members, and said step of unblocking includes the step of retracting said piston rod to permit the smaller opening and closing members to pivot by gravity to said open position.

* * * * *

UNITED STATES PATENT AND TRADEMARK OFFICE
CERTIFICATE OF CORRECTION

PATENT NO. : 5,628,613
DATED      : May 13, 1997
INVENTOR(S) : TAWARA

It is certified that error appears in the above-indentified patent and that said Letters Patent is hereby corrected as shown below:

On the Title Page, under Item [56] References Cited,

Under U.S. PATENT DOCUMENTS, delete "5,020,165   6/1991   Tanaka et al...414/404X"

Under FOREIGN PATENT DOCUMENTS, insert --3-33811     4/1991  Japan
        63-176622   11/1988  Japan
        2-86903      7/1990  Japan--

Signed and Sealed this

Twenty-third Day of September, 1997

Attest:

BRUCE LEHMAN

Attesting Officer    Commissioner of Patents and Trademarks